US010306316B2

(12) United States Patent
Rakshit (10) Patent No.: US 10,306,316 B2
(45) Date of Patent: May 28, 2019

(54) ATTENTION DIVERTER RESPONSIVE TO DETERMINATION OF VIEWER AND CONTENT

(71) Applicant: INTERNATIONAL BUSINESS MACHINES CORPORATION, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/425,318

(22) Filed: Feb. 6, 2017

(65) Prior Publication Data

US 2018/0227633 A1   Aug. 9, 2018

(51) Int. Cl.
H04N 21/454 (2011.01)
H04N 21/466 (2011.01)
H04N 21/442 (2011.01)

(52) U.S. Cl.
CPC ... *H04N 21/4542* (2013.01); *H04N 21/44218* (2013.01); *H04N 21/4661* (2013.01)

(58) Field of Classification Search
CPC ............. H04N 21/4542; H04N 21/454; H04N 21/44016; H04N 21/4661
See application file for complete search history.

(56) References Cited

U.S. PATENT DOCUMENTS

| 8,443,436 | B1 | 5/2013 | Sankruthi |
| 9,165,144 | B1 | 10/2015 | Goldstein et al. |
| 2010/0077435 | A1 | 3/2010 | Kandekar et al. |
| 2014/0279733 | A1 | 9/2014 | Djugash |
| 2016/0322018 | A1* | 11/2016 | Peterson .................. G09G 3/38 |
| 2016/0323643 | A1* | 11/2016 | Panchaksharaiah ........ H04N 21/44016 |

OTHER PUBLICATIONS

Peter Mell et al, The NIST Definition of Cloud Computing, National Institute of Standards and Technology, Publication 800-145, 2011.

(Continued)

*Primary Examiner* — Hunter B Lonsberry
(74) *Attorney, Agent, or Firm* — Patrick J. Daugherty; Daugherty & Del Zoppo Co., LPA (57) ABSTRACT

Aspects provide for attention diversion selection and presentment in response to observer identity and content attributes executes steps on a computer processor. In response to determining that a portion of content that has objectionable content with respect to a first observer of a presentation of media content will be presented to the first observer and to a second observer over an upcoming future presentation period of time, a computer processor selects a competing sensory stimulus that is indicated as interesting to the first observer and sufficiently distracting during the future time period that it will interfere with comprehension by the first observer of an objectionable attribute of the objectionable content portion as a function of historical data applicable to the first observer. The computer processor further drives a device to present the selected sensory stimulus to the first observer prior to the future time period.

12 Claims, 4 Drawing Sheets

(56) References Cited

OTHER PUBLICATIONS

Kaspersky Lab, A safer way for kids to expore their digital world, Kaspersky Safe Kids, Cyberbullying Protection, Kaspersky Lab, http://windows. microsoft.com/en-in/windows/set/-parental-controls#1TC=windows-7, 1997-2016.
Parental Control Bar, Parental Monitoring Software for the Internet, http://parentalcontrolbar.com, WRAAC.org, 2009.
Best Parental Control Software—QUSTODIO, The Internet's best parental control software, https://www.qustodio.com/en, 2016.

\* cited by examiner

ATTENTION DIVERTER RESPONSIVE TO DETERMINATION OF VIEWER AND CONTENT

BACKGROUND

Multimedia content comprehends a variety of visual and audio content. Some illustrative but not exhaustive examples include cinema (movies), television shows, radio programs, musical performances, spoken words performances and theatrical productions. It is common for multimedia content to be enjoyed and shared by groups of people. Such groups may include people with widely different levels of maturity, for example a family with adults and children of varying ages.

Parents, teachers, coaches, care-givers and other people may be tasked with the responsibility of choosing multimedia content that is appropriate to the level of maturity, cognitive development and emotional capabilities of members of a group watching, listening to or otherwise engaging with multimedia content. Service providers may provide ratings that are useful in assessing the appropriateness of multimedia content items, wherein viewers may choose content based on having an appropriate content rating. For example, a "General" or "G-rating" signifies content very mild in impact and suitable for everyone; "Parental Guidance (PG)" indicates content still relatively mild in impact but not recommended for viewing or playing by persons under the age of 15 without guidance from parents or guardians; and "Mature (M)" is an advisory category that indicates content that is not mild relative to G and PG rated content and that is recommended only for mature audiences, and thus not recommended for children under 15 years regardless of guidance from parents or guardians.

Parental control systems enable parents to filter out media content having ratings inappropriate to the viewers, such as by entirely preventing the presentation of content items with mature content ratings to children, or by actively filtering out or redacting only those portions of a movie or other content item that are rated or designated as presenting mature content, allowing the remaining portions to be viewed by all ages.

BRIEF SUMMARY

In one aspect of the present invention, a computerized method for attention diversion selection and presentment in response to observer identity and content attributes executes steps on a computer processor. In response to determining that a portion of content that has objectionable content with respect to a first observer of a presentation of media content will be presented to the first observer and to a second observer over an upcoming future presentation period of time, the computer processor selects a competing sensory stimulus that is indicated as interesting to the first observer and sufficiently distracting during the future time period that it will interfere with comprehension by the first observer of an objectionable attribute of the objectionable content portion as a function of historical data applicable to the first observer. The computer processor further drives a device to present the selected sensory stimulus to the first observer prior to the future time period.

In another aspect, a system has a hardware processor in circuit communication with a computer readable memory and a computer-readable storage medium having program instructions stored thereon. The processor executes the program instructions stored on the computer-readable storage medium via the computer readable memory and thereby, in response to determining that a portion of content that has objectionable content with respect to a first observer of a presentation of media content will be presented to the first observer and to a second observer over an upcoming future presentation period of time, selects a competing sensory stimulus that is indicated as interesting to the first observer and sufficiently distracting during the future time period that it will interfere with comprehension by the first observer of an objectionable attribute of the objectionable content portion as a function of historical data applicable to the first observer. The processor further drives a device to present the selected sensory stimulus to the first observer prior to the future time period.

In another aspect, a computer program product for attention diversion selection and presentment in response to observer identity and content attributes has a computer-readable storage medium with computer readable program code embodied therewith. The computer readable hardware medium is not a transitory signal per se. The computer readable program code includes instructions for execution which cause the processor to, in response to determining that a portion of content that has objectionable content with respect to a first observer of a presentation of media content will be presented to the first observer and to a second observer over an upcoming future presentation period of time, select a competing sensory stimulus that is indicated as interesting to the first observer and sufficiently distracting during the future time period that it will interfere with comprehension by the first observer of an objectionable attribute of the objectionable content portion as a function of historical data applicable to the first observer. The processor is further caused to drive a device to present the selected sensory stimulus to the first observer prior to the future time period.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
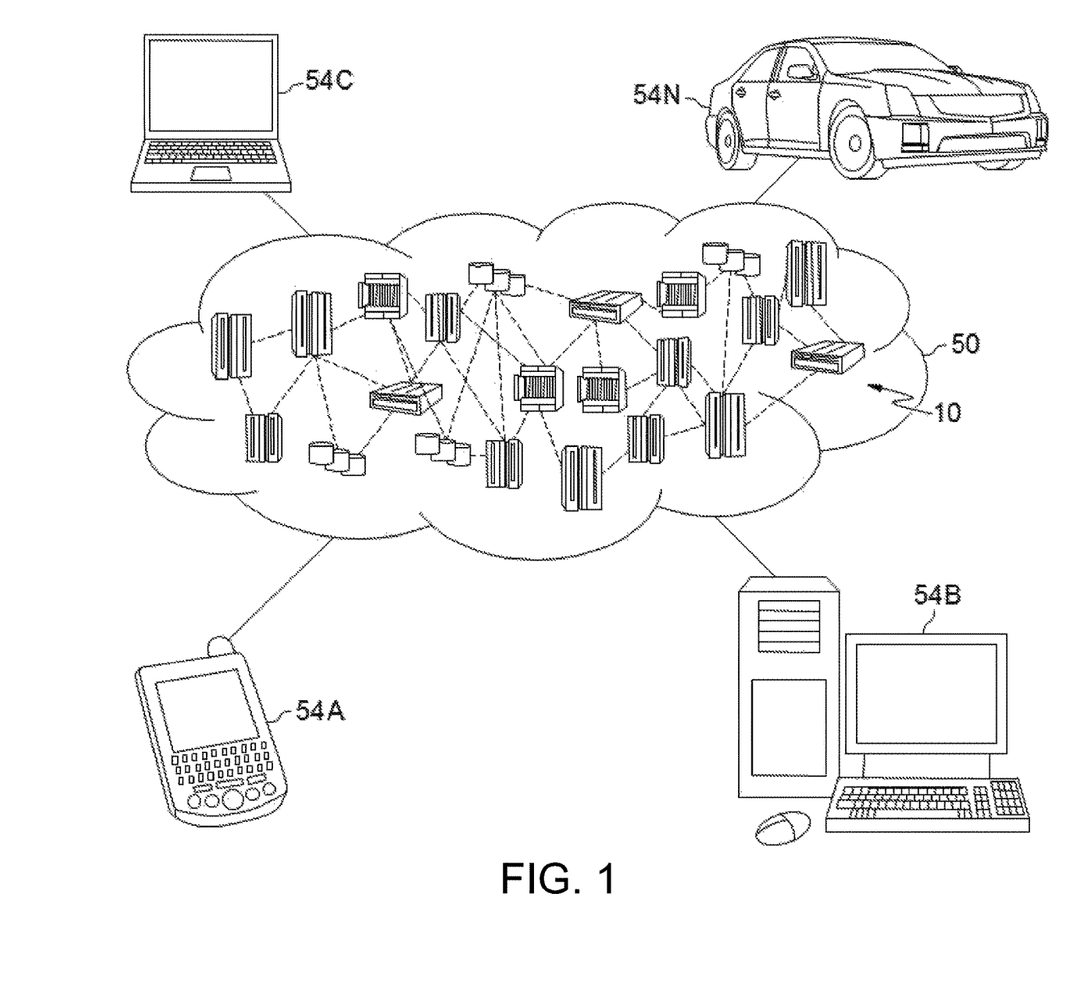
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
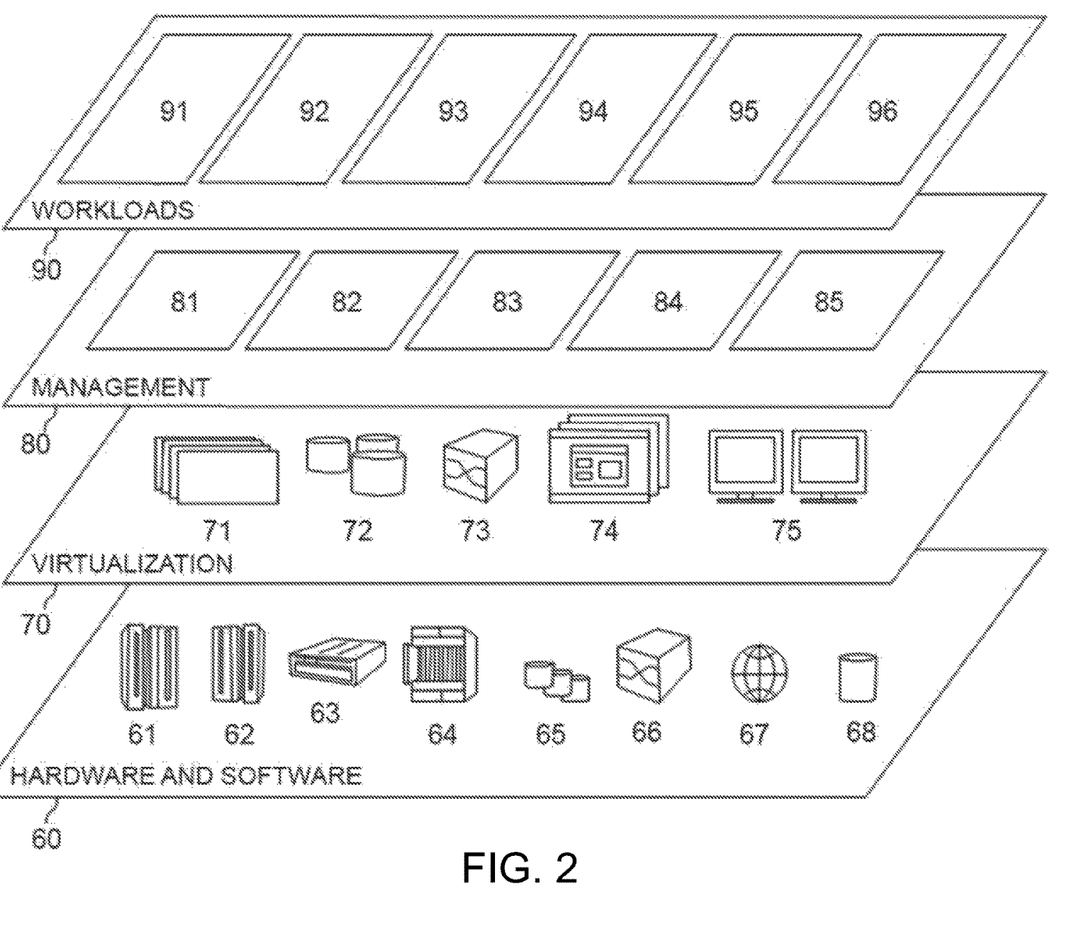
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
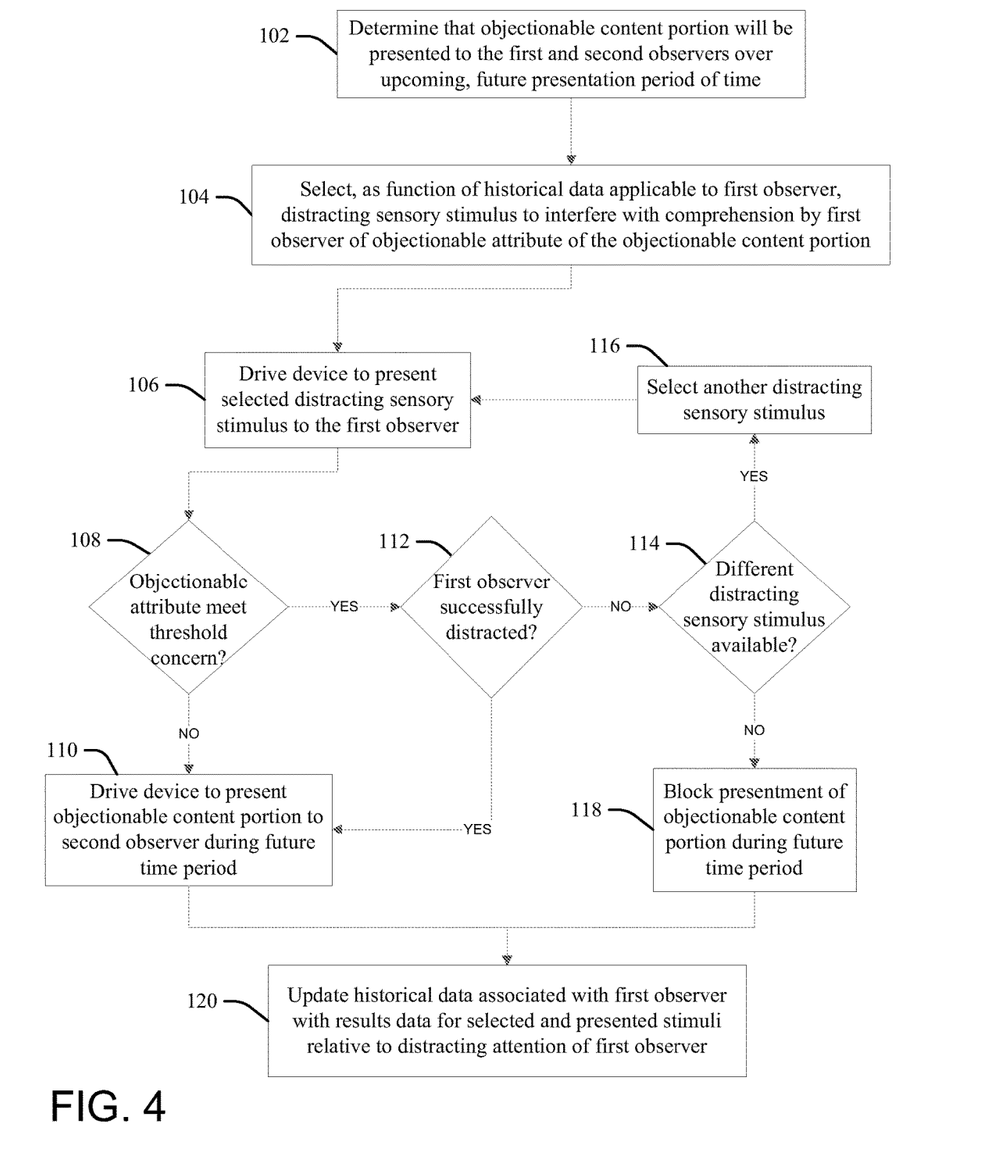
FIG. 4 is a flow chart illustration of a process or system for attention diversion selection and presentment in response to observer identity and content attributes according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for attention diversion selection and presentment in response to observer identity and content attributes according to embodiments of the present invention, for example to execute the process steps or system components or tasks as depicted in FIG. 4 below.

Figure 3:
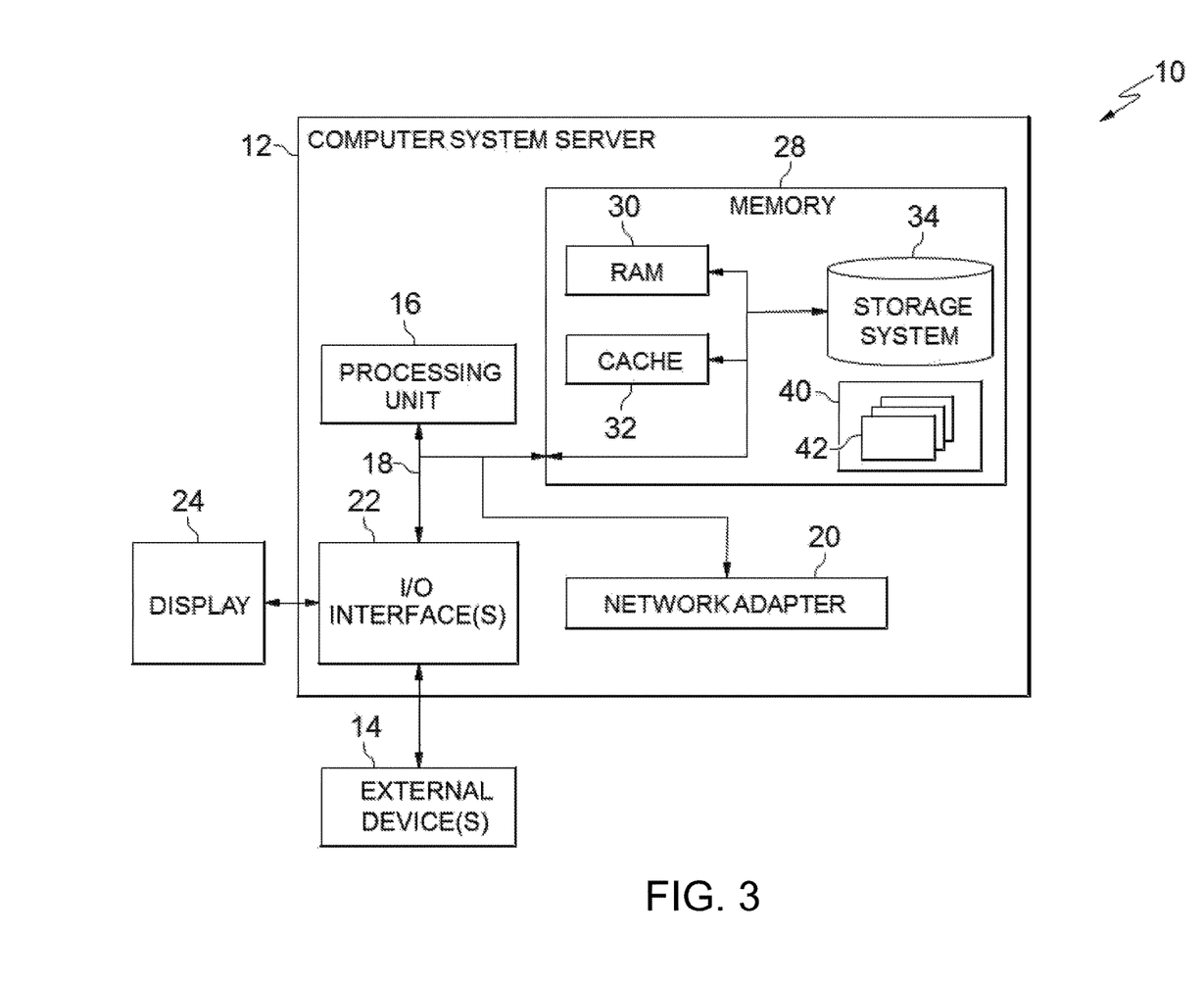
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Prior art parental control systems that enable parents or other guardians to filter out media content having ratings inappropriate to viewers by entirely preventing the presentation of content items with mature content ratings or by actively filtering out or redacting content portions may fail to meet the needs or desires of the viewers. If only a small number of scenes of a movie are objectionable, it may be dissatisfying to entirely prevent presentation of the movie to the other, more mature members of a group. Further, active filtering may result in redactions that disrupt story narrative or convey only an incomplete story.

Moreover, objectionable content may vary in degrees of severity, or in requisite maturity, experience or cognitive development needed to comprehend the objectionable nature of the subject matter nature. Thus, a viewer may prefer to entirely prevent the display of overtly objectionable images on a television screen while young children are present, but may wish to allow more nuanced, indirectly objectionable content to be presented in their presence if the children cannot understand the objectionable nature of the content, due to their lower or more limited levels of maturity, experience or cognitive development relative to older viewers of the same content.

For example, "double entendre" content may be understood in either of two ways, wherein the same content has a double meaning for some viewers. Typically, one of the meanings is obvious and overt as a function of context, whereas the other may require more thought, a deeper meaning that becomes apparent through the context of wisdom or life experience the viewer. Such deeper meanings may not be readily apparent to children and other viewers with limited life experience, where they do not have the cognitive the context required to readily understand the second, deeper meaning. Often the second, deeper meaning is conveyed via indirect references or innuendo, particularly when the message content may be indelicate, socially awkward, inappropriately suggestive or offensive to state directly. Double entendres may exploit puns to convey the second meaning, generally by relying on multiple meanings of words, or different interpretations of the same primary meaning, and often exploit ambiguity.

Thus, a guardian might prefer that double entendre content be allowed past parental guidance filters, wherein its presence does not trigger blocking of the entire content or portions thereof, due merely to the presence of small children. This avoids the inconveniences caused by content blocking and redactions in the case of double entendre content that is not be effectively objectionable at all to the present children, such as where an immature member of the audience does not understand the deeper, objectionable meaning of language terms or concepts used or hinted at within a verbal pun presented by character dialog.

However, children may be able to sense or perceive the presence of objectionable content presented by this deeper meaning, and process the meaning later from the viewed content via acquiring other clues, tips and knowledge. For example, the reactions of the other, more mature members of an audience may serve as a cue to a child to pay more attention to the content, and expend more effort to comprehend other meanings implied by double entendre content. Thus, allowing such content past filters to be presented to children may be problematic.

FIG. 4 illustrates a process or system according to the present invention that automatically selects and deploys a method for attention diversion selection and presentment in response to observer identity and content attribute. At 102 a processor configured by computer readable medium instructions according to an aspect of the present invention determines that a portion of content that has objectionable content with respect to a first observer (viewer of image content, listener to audio content, reader of text content, etc.) of a presentation of media content (hereinafter sometimes the "objectionable content portion") will be presented to the first observer and to a second observer over an upcoming, future presentation period of time. The media content may comprise image content without audio (for example, a television show presentation with sound muted), audio-only content (for example, an audio podcast of a comedic performance), or multimedia content (a movie or television show presentation having both visual and audio content). Thus, the future period of time may be an elapsed time of a scene in a video that is about to be presented, for example within five seconds, ten seconds, etc.

Accordingly, in response to determining at 102 that the objectionable content portion will be presented to the first and second observers over the future presentation time period, at 104 the configured processor selects, as a function of a historical data applicable to the first observer, a competing, distracting sensory stimulus that is both interesting to the first observer, and is sufficiently distracting during the future time period that it will interfere with comprehension by the first observer of the objectionable attribute of the objectionable content portion.

In some embodiments the configured processor selects the competing sensory stimulus as a function of an attribute of the objectionable content portion, in response to matching a type of sensory content of the objectionable attribute of the objectionable content portion. For example, if the objectionable content portion is audio content, the competing sensory stimulus may be a favorite song broadcast by a personal audio device of the first observer, wherein the competing audio stimuli drowns out or become the primary focus of the first observer relative to the objectionable portion audio content. If the objectionable content portion comprises visual imagery, the competing sensory stimulus may be activation of a favorite robotic toy that will cause the first observer to look at the toy instead of at a display screen showing the objectionable content. If the objectionable content portion comprises textual information, the competing sensory stimulus may be activation of an electronic book device that displays competing text content for reading and comprehension by the first observer. Still other selection criteria and satisfactions will be apparent to one skilled in the art.

At 106 the configured processor drives a device (such as a graphic display screen, and audio speaker, a robotic toy, etc.) to present the competing sensory stimulus to the first observer prior to the future time period.

At 108 the configured processor determines whether the perceivable objectionable attribute of the objectionable content portion meets a threshold concern. Meeting the high concern threshold indicates that the present aspect should ensure that the first observer has been successfully distracted before or during presentment of the objectionable content portion to the second observer. The threshold concern has a value reflecting a relative strength of the objectionable nature of the content, indicating that material presented is strongly objectionable (for example rated M, not PG).

If the perceivable objectionable attribute of the objectionable content portion does not meet the high concern threshold at 106 (for example, the objectionable attribute is only mildly offensive, or wherein perception of indirectly offensive content requires complex processing that the first observer is unlikely to be able to complete), in some aspects at 110 the configured processor drives a device to present the objectionable content portion to the second observer during the future time period (thus, regardless of whether or not the first observer is successfully distracted).

The threshold concern may also reflect the relative effort required on the part of the first observer to perceive the objectionable attribute, wherein a determination that the objectionable attribute is obvious, or quickly or readily understandable with minimal processing by the first observer meets the high concern threshold value, but wherein if the objectionable attribute is likely obscure to the first observer, not obvious or not readily understandable without additional information or complex processing by the first observer, the objectionable content portion may not meet the high concern threshold.

Aspects of the present invention may identify the objectionable content portion, or the objectionable attribute thereof, as indirectly objectionable content, as distinguished from overtly objectionable content (for example strong or shocking imagery or language) that is readily or immediately perceivable by the first observer. Indirectly objectionable content comprises double entendre or other content that requires attention and effort on the part of the first observer to process in order to perceive and understand an objectionable nature or attribute of the content (for example, a pun that requires an understanding of adult subject matter to convey humor). Thus, a parent or other more mature second observer also viewing the current media content presentation that has the requisite level of maturity, experience and/or cognitive development to process and understand an indirectly objectionable portion, may wish to continue the presentation of the media content during the upcoming future period, dependent upon successfully distracting the first observer from paying attention to the indirectly objectionable portion during the future period of time (and thereby perceiving, or being enable to perceive at a later time through recall, etc., the objectionable nature or attribute of the indirectly objectionable portion). In this fashion aspects of the present invention enable an adult second observer to view presentation of indirectly objectionable content portions during the upcoming future time period, to thereby comprehend and understand the objectionable nature or attribute, while in the presence of a child first observer, provided that the child is distracted by competing stimuli and thereby cannot perceive and understand the objectionable content or nature.

Accordingly, if the perceivable objectionable attribute meets the high concern threshold at 108, at 112 the configured processor determines whether or not the first observer has been successfully distracted from attention to a presentment of the objectionable content portion during the future time period. For example, the configured processor may use cameras to obtain video imagery of the first observer to identify facial expressions, direction of gaze or body language indicative of an attention level or focus of attention of the first observer, and thereby determine whether the first observer is paying attention to a device about to present the objectionable content portion. The configured processor may process data acquired from proximity detection devices, or geographic locations provided by personal devices carried by the first observer (such as a smart phone), to thereby determine whether or not the first observer has left the room wherein the objectionable content portion will be presented, for example to go into another room to play with a robot toy driven to present the competing sensory stimulus.

The configured processor may also monitor data generated by a device driven to present the competing stimuli to confirm that the first observer is engaged with and paying primary attention to the drive device prior to and during the future time period. For example, the configured processor may verify that the first observer is actively engaged with playing a competing stimulus game on a gaming console, watching a cartoon displayed on a competing graphic display device, or is manipulating or otherwise engaging and generating input data from physically playing with a robotic toy.

If the first observer is determined to be successfully distracted at 112, then the configured processor presents the objectionable content portion to the second observer at 110. If not, at 114 the configured processor determines whether another, different competing sensory stimulus (as yet unselected and deployed at 106) is available for selection and indicated as both interesting to the first observer, and sufficiently distracting that it will interfere with comprehension of the objectionable content portion (or objectionable attribute thereof) by the first observer during the future time period, as a function of the historical data applicable to the first observer.

If an additional stimulus is determined to be available for selection and use at 114, at 116 the configured processor selects said additional stimulus, and drives a device to present the additional stimulus at 106. Thus, when an objectionable attribute or ease of perception thereof is determined as meeting the threshold concern at 108, until determined at 112 that the first observer has been successfully distracted from the objectionable content portion during the future time period the configured processor iteratively identifies available alternatives at 114 and selects at 116 and presents at 106 the different selected stimuli.

If no more competing, distracting sensory stimuli are identified as available for use at 114, at 118 the configured processor blocks presentment of the objectionable content portion during the future time period. For example, where the objectionable content portion is an upcoming scene in a streaming presentation of movie to the first and second observers on a television set, at 118 the configured processor may cause a device presenting the streaming presentation to pause the presentation until the first observer leaves the room or the second observer overrides the pause, or skip the scene, etc.

In some aspects of the present invention the configured processor identifies and selects distracting stimuli based on the first observer's age and attention level with respect to the presented media contents. Younger observers may be more easily distracted from the content than older observers, as they may have a harder time paying attention long enough in general, and therefore to the objectionable content. Thus, the configured processor may choose a length of time or volume of presentment of the selected distracted stimuli in response to determining the age of the first observer, wherein the time may be shorter, or the volume louder, for a younger child (pre-school or elementary school-aged child), relative to longer length of time, or a more complex and less immediate sound, needed to successfully distract the attention of an older child (teenager) as the first observer.

Illustrative but not limiting or exhaustive examples of competing stimuli for younger children (younger than a teenager or other rating criteria age) as the first observer include driving a robot toy to request (via audio and visual communications) that the child come and play with the robot; generating an automatic installation or initialization of game on a game console that historical or demographic data indicates is highly desired by the child; causing a television to present a preview of clip of a movie that the child wants to view; automatically adding a beneficial asset (points, powers, items, etc.) to the account of the child within a game, and notifying the child of the addition, in order to encourage the child to move their current attention away from the objectionable content portion and toward playing the game, and still others will be apparent to one skilled in the art.

The configured processor may select between competing sensory stimuli based on rankings and priorities indicated in historical data applicable to the first user, for example selecting content items that are more often viewed or more currently viewed (videos, games, television shows, cartoons, etc.) relative to other items, and driving an appropriate device (tablet, gaming console, dedicated television monitor in a child's playroom, audio player, child's smart phone, toy having a display screen and audio speaker, etc.) to present the selected item.

The configured processor may select between competing sensory stimuli based on the locations of devices used for their presentment relative to a device presenting the objectionable content portion to the second observer. Thus, the configured processor may chose stimuli in response to determining that a device available for presenting the chosen stimuli is in a room adjacent to a room occupied by the first and second observers while viewing the presented media, wherein presenting the chosen stimuli on the device in the adjacent room will cause the first observer to leave the current room and enter the adjacent room to engage the presented device, to watch a display screen thereon, or to pick up and physically engage a toy broadcasting the stimuli, etc.

Generally the configured processor causes presentment of selected competing sensory stimuli prior to and during the future period during which the objectionable content portion will be presented, in order to ensure that the first observer is distracted, or has left the room presenting the objectionable content, prior to the future time period, and will stay distracted or out of the room over the future time period. Thus, the time boundaries of presentment of the objectionable content portion may define time periods for initiating and maintaining presentment of competing sensory stimuli.

Illustrative but not exhaustive examples of selecting and presenting competing sensory stimuli for a child first observer include causing a favorite cartoon program to start playing on a television or game console monitor in another room, at initial volume level selected to be loud enough to be perceived by the child from the other room in the current location of the child; causing a mobile gaming device within the same room as the child to start playing a favorite game of the child, so that the child picks up the device and starts playing the game, thereby ignoring the objectionable media content portion when presented to the second observer; causing a cartoon character to be overlaid on the currently displayed contents, thereby visually calling attention away from the objectionable content portion while it is displayed to both the first and second observers; and causing a robotic toy to start interacting with the child, such as by travelling over to the child and flashing lights or calling the child's name, to actively demand the attention of the child and thereby distract the child's attention from a display screen and audio speakers conveying the objectionable content portion.

The configured processor generally selects and display competing sensory stimuli in advance of the future time of presentment of the objectionable content portion, in order to break the concentration or attention of the first observer of the current content prior to the future time period during which the objectionable content portion will be presented. In some examples the configured processor pauses and breaks a presentation of media content on a video or audio playback device at a point in time that is prior to the future time period and drives the device to present competing sensory stimulus, such as an advertisement for a product, a news item, documentary content targeted to a different age or interest of the first observer, or some other content of no or little interest to the first observer (as indicated or confirmed by historical or demographic data of the first observer). Such aspects may thereby cause a child first observer to lose interest in and stop observing the current content presentation, in some examples by intentionally making the current content presentation boring to the child first observer as a function of their historic interest preferences.

Aspects of the present invention may recognize, determine or consider a variety of historical and demographic data in selecting and presenting competing sensory stimuli. For example, a processor configured according to the present invention may capture the usage log data for the first observer from a personal programmable device (home network server, game console, smart phone, laptop computer, tablet, etc.) or social media activity (items marked as "liked") to identify items preferred by the first observer, such as songs, games, videos, cartoon titles or characters, etc., that are frequently chosen for watching, playing, or liking.

Aspects of the present invention may also determine first observer preferences for engaging with a same competing sensory stimuli or type of stimuli on a regular or repetitive basis. For example, a processor configured according to the present invention may determine that one child has a recent historical data of watching a same video title over and over, and responsively select and use this title as a preferred competing stimulus for that child. The processor may also determine that historical video streaming viewing data associated with another, different child indicates that this other child does not like to repeat content; accordingly, the competing sensory stimulus selected and presented to this other child may be video title that is within a favorite (frequently watched) series but is as of yet unwatched by the other child.

The configured processor may select the stimulus (at 104 and 116, FIG. 4) in response to preference rankings indicated by historic or demographic data applicable to the first observer. For example, choosing a title from a first cartoon series that is more often watched by the first observer, or that is more popular with other observers sharing a demographic attribute of the first observer (age, school grade level, favorite sporting team participation or interest, etc.), relative to another title, or to titles from a different cartoon series.

Selection of the stimulus may also be in response to context-dependent preferences. For example, the configured processor may choose favorite or preferred competing stimuli as a function of historical data indicating correlation to a time of day or day of week when the first observer tends to prefer watching a certain show, playing a certain game, listening to or playing music, playing games with other people, etc.

Selection of the stimulus may also be in response determining time of start and duration of the objectionable content portion during the future time period. For example, in response to determining that the duration is short (five seconds or less, or another threshold time indicated as appropriate by one skilled in the art), the configured processor may select and present a stimulus that has a short presentation time but a high likelihood of getting immediate attention from the first observer, immediately prior to the future time period: for example, triggering a ring tone or other alert on a cell phone of the first observer located in another room, triggering a robot toy to generate a short series of flashing lights and loud audio sounds, etc. In contrast, for longer durations of objectionable content portion (over five seconds, etc.), the configured processor may cause a game console to start playing a favorite cartoon video that has a duration time longer than the duration of objectionable content portion, or to drive the robot toy to generate an alarm, series of flashing lights and loud audio sounds that continues for a period of time spanning the duration of the future time during which the objectionable content is presented, or until the first observer manually silences the alarm, to thereby grab the attention of the first observer at a time prior to the future time, and for a total time that includes the duration of the objectionable content portion during said future time period.

The duration of the inappropriate content portion may also be determinative of the location of the presentment of the competing stimulus. For example, if the duration of the objectionable content is only for a few seconds, then the configured processor causes the presentment of a stimulus within the same room as the presentment of the inappropriate content portion to the second observer, as the stimuli may quickly and easily distract the first observer. The longer the duration of the objectionable content, the more likely that the competing stimulus may fail to distract the first observer, and therefore the more likely (or higher ranked for selection) that the competing stimulus is selected by the configured processor in response to its presentment being located in a different room.

At 120, in a learning and feedback process the configured processor updates the historical data associated with the first observer with results data (response time, success or failure to distract attention, etc.) for the selected and presented stimuli. Based on this learning process the present aspect learns which stimuli work best for given first observers and content attributes in distracting the attention of the first observer from the inappropriate content portion prior to or during the future time period. Aspects thereby learn, identify and re-rank competing stimuli for various attributes (interesting contents, boring content, required TV loudness, etc.) that are useful for selection in future iterations.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for attention diversion selection and presentment in response to observer identity and content attributes, comprising executing on a computer processor:

in response to determining that a portion of content that has objectionable content with respect to a first observer of a presentation of media content will be presented to the first observer and to a second observer over an upcoming future presentation period of time, wherein the first observer is a child and younger than a teenager, selecting a competing sensory stimulus that is indicated as interesting to the first observer as a function of historical usage log data applicable to the first observer and as sufficiently distracting during a duration of the future time period that it will interfere with comprehension by the first observer of an objectionable attribute of the objectionable content portion;

driving a device to present the selected sensory stimulus to the first observer prior to the future time period, wherein driving the device to present the selected sensory stimulus to the first observer prior to the future time period is selected from the group consisting of driving a robot toy to request via audio and visual communication that the first observer engage the robot toy, generating an initialization of game on a game console that the historical data indicates is highly desired by the first observer, and notifying the first observer of the addition of a beneficial asset to an account of the first observer within a game;

in response to determining that the objectionable attribute of the objectionable content portion meets a threshold concern value, determining whether the first observer has been successfully distracted from attention to presentment of the objectionable content portion during the future time period;

in response to determining that the first observer has been successfully distracted from attention to presentment of the objectionable content portion during the future time period, presenting the objectionable content portion to the second observer during the future time period; and in response to determining that the first observer has not been successfully distracted from attention to presentment of the objectionable content portion during the duration of the future time period, selecting another, different competing sensory stimulus that is indicated as interesting to the first observer as a function of the historical usage log data and as sufficiently distracting during the duration of the future time period that it will interfere with comprehension by the first observer of the objectionable attribute of the objectionable content portion, and driving a device to present the other, different selected sensory stimulus to the first observer prior to the future time period.

2. The method of claim 1, further comprising:

in response to determining that the first observer has not been successfully distracted from attention to presentment of the objectionable content portion during the future time period, and that no other different competing sensory stimuli are indicated as interesting to the first observer and sufficiently distracting during the future time period that it will interfere with comprehension by the first observer of the objectionable attribute of the objectionable content portion as a function of historical data applicable to the first observer, blocking presentment of the objectionable content portion to the second observer during the future time period.

3. The method of claim 1, further comprising:
presenting the selected competing sensory stimulus for a length of time that is selected to match an age of the first observer, wherein the presentment length of time is selected to be shorter for a pre-school first observer relative to the presentment length of time selected for a teenaged first observer.

4. The method of claim 1, further comprising:
selecting the competing sensory stimulus in response to determining that the selected competing sensory stimulus is located in a room that is different from a room occupied by the second observer in which the objectionable content portion is presented to the second observer during the future time period.

5. The method of claim 1, further comprising:
integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the selecting the competing sensory stimulus, the driving the device to present the selected sensory stimulus to the first observer prior to the future time period, the determining whether the first observer has been successfully distracted from attention to presentment of the objectionable content portion during the future time period, the presenting the objectionable content portion to the second observer during the future time period, the selecting another different competing sensory stimulus and the driving the device to present the other, different selected sensory stimulus to the first observer prior to the future time period.

6. The method of claim 5, wherein the computer-readable program code is provided as a service in a cloud environment.

7. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
in response to determining that a portion of content that has objectionable content with respect to a first observer of a presentation of media content will be presented to the first observer and to a second observer over an upcoming future presentation period of time, wherein the first observer is a child and younger than a teenager, selects a competing sensory stimulus that is indicated as interesting to the first observer as a function of historical usage log data applicable to the first observer and as sufficiently distracting during a duration of the future time period that it will interfere with comprehension by the first observer of an objectionable attribute of the objectionable content portion;
drives a device to present the selected sensory stimulus to the first observer prior to the future time period, wherein driving the device to present the selected sensory stimulus to the first observer prior to the future time period is selected from the group consisting of driving a robot toy to request via audio and visual communication that the first observer engage the robot toy, generating an initialization of game on a game console that the historical data indicates is highly desired by the first observer, and notifying the first observer of the addition of a beneficial asset to an account of the first observer within a game;
in response to determining that the objectionable attribute of the objectionable content portion meets a threshold concern value, determining whether the first observer has been successfully distracted from attention to presentment of the objectionable content portion during the future time period;
in response to determining that the first observer has been successfully distracted from attention to presentment of the objectionable content portion during the future time period, presents the objectionable content portion to the second observer during the future time period; and
in response to determining that the first observer has not been successfully distracted from attention to presentment of the objectionable content portion during the future time period, selects another, different competing sensory stimulus that is indicated as interesting to the first observer as a function of the historical usage log data and as sufficiently distracting during the duration of the future time period that it will interfere with comprehension by the first observer of the objectionable attribute of the objectionable content portion, and drives a device to present the other, different selected sensory stimulus to the first observer prior to the future time period.

8. The system of claim 7, wherein the processor executes the program instructions stored on the computer-readable storage medium via the computer readable memory and thereby further:
presents the selected competing sensory stimulus for a length of time that is selected to match an age of the first observer, wherein the presentment length of time is selected to be shorter for a pre-school first observer relative to the presentment length of time selected for a teenaged first observer.

9. The system of claim 7, wherein the processor executes the program instructions stored on the computer-readable storage medium via the computer readable memory and thereby further:
selects the competing sensory stimulus in response to determining that the selected competing sensory stimulus is located in a room that is different from a room occupied by the second observer in which the objectionable content portion is presented to the second observer during the future time period.

10. A computer program product for attention diversion selection and presentment in response to observer identity and content attributes, the computer program product comprising:
a computer readable storage medium having computer readable program code embodied therewith, wherein the computer readable storage medium is not a transitory signal per se, the computer readable program code comprising instructions for execution by a processor that cause the processor to:

in response to determining that a portion of content that has objectionable content with respect to a first observer of a presentation of media content will be presented to the first observer and to a second observer over an upcoming future presentation period of time, wherein the first observer is a child and younger than a teenager, select a competing sensory stimulus that is indicated as interesting to the first observer as a function of historical usage log data applicable to the first observer and as sufficiently distracting during a duration of the future time period that it will interfere with comprehension by the first observer of an objectionable attribute of the objectionable content portion;

drive a device to present the selected sensory stimulus to the first observer prior to the future time period, wherein driving the device to present the selected sensory stimulus to the first observer prior to the future time period is selected from the group consisting of driving a robot toy to request via audio and visual communication that the first observer engage the robot toy, generating an initialization of game on a game console that the historical data indicates is highly desired by the first observer, and notifying the first observer of the addition of a beneficial asset to an account of the first observer within a game;

in response to determining that the objectionable attribute of the objectionable content portion meets a threshold concern value, determine whether the first observer has been successfully distracted from attention to presentment of the objectionable content portion during the future time period;

in response to determining that the first observer has been successfully distracted from attention to presentment of the objectionable content portion during the future time period, present the objectionable content portion to the second observer during the future time period; and in response to determining that the first observer has not been successfully distracted from attention to presentment of the objectionable content portion during the future time period, select another, different competing sensory stimulus that is indicated as interesting to the first observer as a function of the historical usage log data and as sufficiently distracting during the duration of the future time period that it will interfere with comprehension by the first observer of the objectionable attribute of the objectionable content portion, and drive a device to present the other, different selected sensory stimulus to the first observer prior to the future time period.

11. The computer program product of claim 10, wherein the computer readable program code instructions for execution by the processor further cause the processor to:

present the selected competing sensory stimulus for a length of time that is selected to match an age of the first observer, wherein the presentment length of time is selected to be shorter for a pre-school first observer relative to the presentment length of time selected for a teenaged first observer.

12. The computer program product of claim 10, wherein the computer readable program code instructions for execution by the processor further cause the processor to:

select the competing sensory stimulus in response to determining that the selected competing sensory stimulus is located in a room that is different from a room occupied by the second observer in which the objectionable content portion is presented to the second observer during the future time period.

* * * * *